Figure 1:
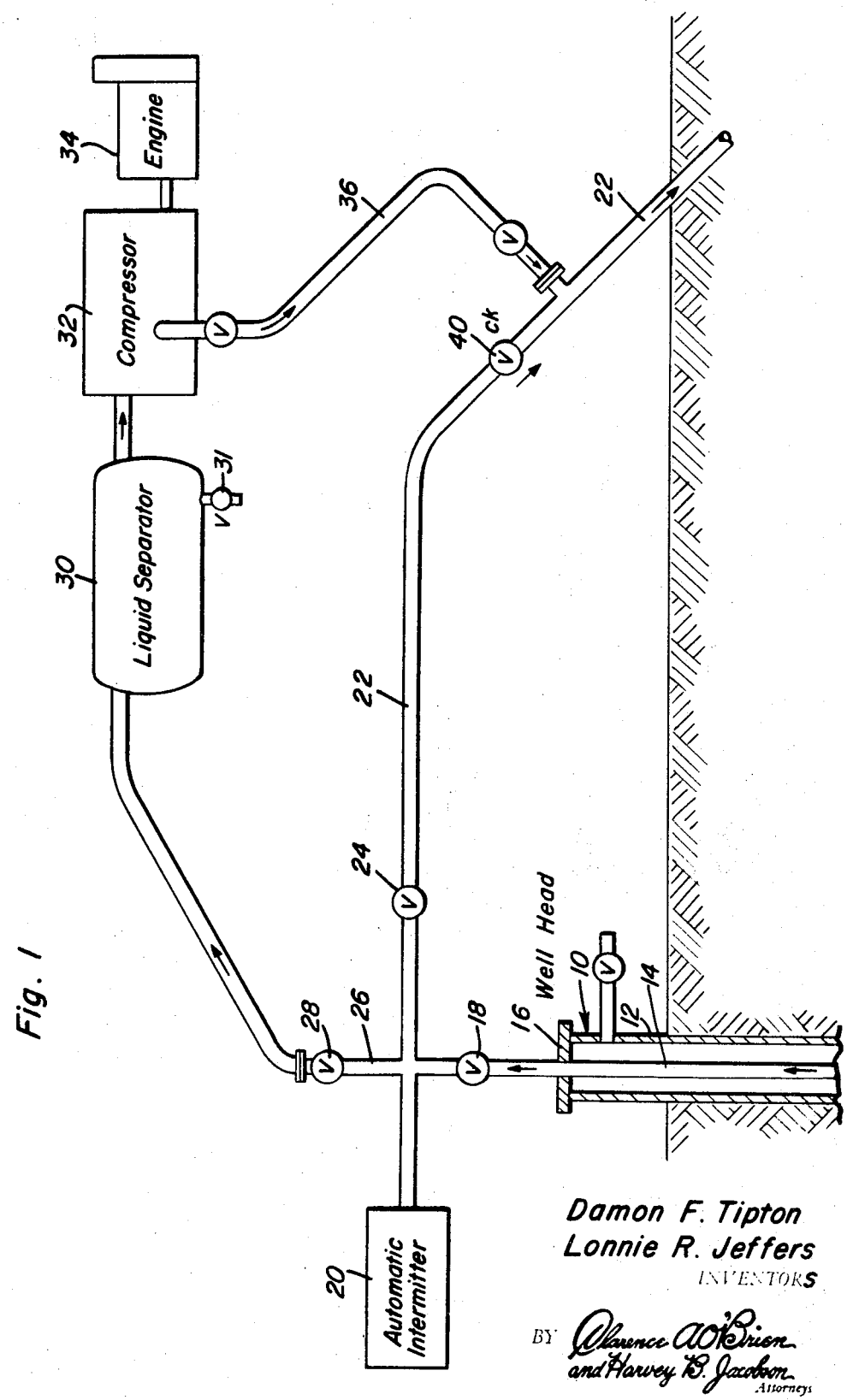

United States Patent
Tipton et al.

[15] 3,707,157

[45] Dec. 26, 1972

[54] NATURAL GAS SAVER WITH SEPARATOR AND COMPRESSOR

[72] Inventors: Damon F. Tipton, P.O. Box 675, Aztec, N. Mex. 87410; Lonnie R. Jeffers, 1900 Wagner, Farmington, N. Mex. 87401

[22] Filed: Aug. 4, 1971

[21] Appl. No.: 168,841

[52] U.S. Cl. ............... 137/14, 137/599.1, 137/569, 137/171
[51] Int. Cl. ............................................ E21b 43/00
[58] Field of Search..... 137/110, 599.1, 14, 569, 197, 137/171

[56] References Cited

UNITED STATES PATENTS

| 3,095,889 | 7/1963 | Barroll | 137/599.1 X |
| 3,286,636 | 11/1966 | Schaub | 137/110 X |
| 3,645,292 | 2/1972 | Schoger | 137/599.1 |

*Primary Examiner*—Alan Cohan
*Attorney*—Clarence A. O'Brien et al.

[57] ABSTRACT

A gas pressure relieving system including a liquid separator and compressor provided to permit separation of liquid components from natural gas and return of the natural gas to a distribution system at an appropriate pressure. The system avoids the pollution normally effected by burn-off at a well head and at the same time provides for recovery of liquid gas for later processing.

5 Claims, 2 Drawing Figures

Damon F. Tipton
Lonnie R. Jeffers
INVENTORS

BY Clarence A. O'Brien
and Harvey B. Jacobson
Attorneys

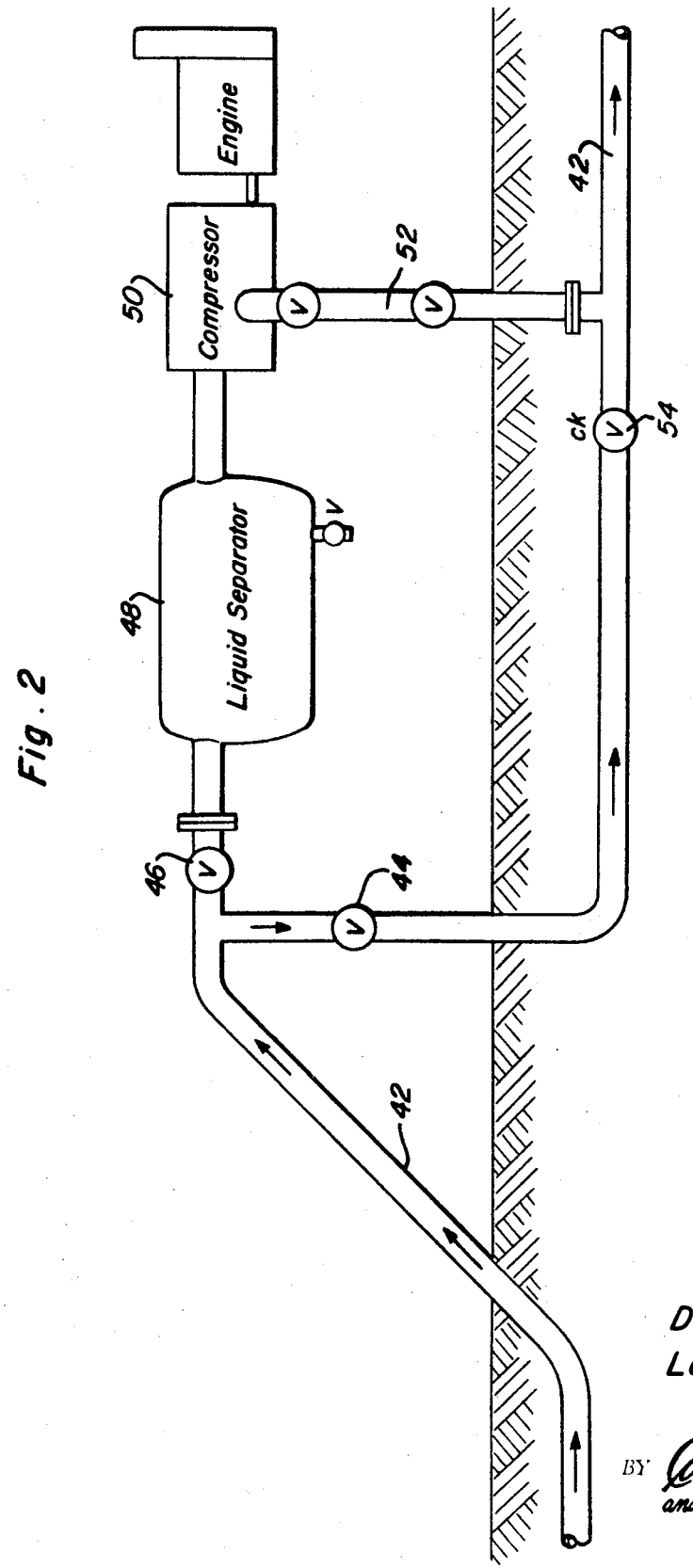

ial application number 3,707,157

NATURAL GAS SAVER WITH SEPARATOR AND COMPRESSOR

The present invention is directed to a method and apparatus for separating liquid constituents from a pressurized gas liquid mixture when venting a gas line and for returning the gaseous constituents to a conduit system under pressure sufficient to permit transportation to a site of subsequent use. Presently during production of natural gas there are instances in which it is necessary to vent the flow of gas directly to the atmosphere. This procedure is known as blowing down. When a system is blown down a large volume of gas and liquid escape directly to the atmosphere and is a source of considerable pollution. One instance in which it is necessary to blow down a natural gas production system is when the pressure in a well has decreases to a pressure lower than that on the service or distribution line due to an accumulation of liquid in the pipe string bringing the gas to the well head.

Frequently a gas line used to convey gas from a well to a service line for public use must also be blown down in order to repair and maintain the lines. Under normal conditions, the lines are blown down to atmospheric pressure with the contents of the pressurized portion which is to be worked upon being vented directly to the atmosphere. As will be appreciated, this also results in a substantial amount of pollution. In addition, the gas and liquid vented to the atmosphere on both occasions result in a considerable loss of a non-replenishable resource. Thus, it is both an object of the present invention to eliminate air pollution caused by the direct venting of gas wells and natural gas transmission lines to the atmosphere, and to avoid a direct and unnecessary waste of natural gas supplies.

Another object of the invention is to provide a method and apparatus for the collection of liquid components of a liquid gas mixture in a natural gas delivery system.

It is a further object of the invention to provide a method and apparatus for maintaining the flow of gas in a service line while repairs are being made thereon. Still another object of the invention is to provide a means whereby the portion of the distribution network not being serviced can be maintained at operating pressure during the repair of a portion of the line while at the same time preventing mixture of the gas with the atmosphere.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a schematic illustration of one embodiment of the invention utilized in a natural gas well system; and FIG. 2 is a schematic illustration of a second embodiment of the invention adapted to aid in the maintenance and repair of a natural gas distribution system.

In the present invention, instead of venting the natural gas-liquid mixture to the atmosphere when it becomes necessary to blow down the distribution or recovery system, a gas-liquid separator and a gas compressor are provided in a bypass line which is attached to the vent. The system is caused to vent directly into the bypass system wherein first the liquid component is separated and stored for later processing. The gaseous component is pressurized to the required service line pressure by the compressor and is fed back into the distribution system. When the pressure at the well head is adequate or, alternatively, the maintenance operation is completed, the system is redirected to its normal flow path.

Referring to FIG. 1, a well head 10 is illustrated, the well head consisting of a casing 12 closed at the top thereof. Within the well casing 12 the well is provided with a tubing string 14 which is suspended from the well head assembly schematically represented by cover 16 and valve 18. The distribution system consists of an automatic intermitter 20, service line 22 with control valve 24 therein, and vent line 26 including an appropriate valve 28 therein which, in the more conventional system, was used to vent or blow down the well to the atmosphere. The conventional apparatus has been modified by directly connecting the exit from the venting valve 28 to a liquid separator 30 which is in turn connected to a compressor 32 driven by engine 34. An appropriate valve controlled feed line 36 extends from the compressor back to a downstream portion of the service line 22. The service line 22 can include an appropriate check valve 40 immediately upstream of the point of engagement of the feed line 36 therewith.

In previous systems, when the gas pressure in the well head was reduced by a build-up of a liquid head in the pipe string 14 to below that required in the service line 22, valve 24 was closed and valve 28 opened to permit a direct venting of the liquid-gas mixture in the pipe string to the atmosphere until all of the liquid components had been removed from the pipe string and the gas pressure had returned to normal. Valve 28 was then closed and the well was put back into operation on the service line by an opening of the valve 24. In the present system, when the pressure is reduced to below that adequate to support the service line due to an increase in the hydraulic head in the pipe string 14, valve 24 is closed and valve 28 opened whereby a direct communication with the liquid separator and compressor is effected. The liquid-gas mixture flows first to the liquid separator where the liquid is permitted to separate from the gaseous component. The gaseous component which is at a greatly reduced pressure is forced by the compressor through the valve controlled feed line 36 back into the service line 22 at a pressure sufficient so as to maintain satisfactory operation of the gas distribution system. Periodically, the liquid component separated by the liquid separator 30 can be drawn off through valve 31. Incidentally, this liquid separator can be of any appropriate type.

Referring to FIG. 2, the system of the invention has been illustrated in conjunction with the venting of a service line 42 itself as opposed to the direct venting of a well head. However, the same problems and advantages exist. More particularly, instead of venting the service line directly to the atmosphere as was done heretofore, the line valve 44 is closed and the venting valve 46 opened to vent the line directly to and through a liquid separator 48 and engine driven compressor 50. The separated gas then flows through valve control feed line 52 back to the service line 42 downstream of an appropriate check valve 54. Upon a completion of such repair or maintenance work as is required on the line, valve 46 is closed and valve 44 opened to put the basic system back in operation.

As can be appreciated, it is not always possible to predict where on a pipeline a maintenance operation will be required. Consequently, it is contemplated that the apparatus of the instant invention, in one form thereof, be of a portable nature so as to be readily transported to a site. Appropriate quick-connect couplings and line-mounted vents of strategic points can also be provided.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A system for blowing down a gas distribution network including a gas service line, said system comprising a bypass line for selectively receiving the flow from the service line, a liquid separator in said bypass line for separating the liquid and gaseous components of a liquid gas mixture, and a compressor in said bypass line downstream of said separator for pressurizing the separated gaseous component to a desired level, and a feed line extending from said compressor back to said service line for a return of the pressurized separated gas component.

2. The system of claim 1 including a shut-off valve in the service line downstream of the point of communication of the bypass line therewith, and a second shut-off valve in said bypass line immediately downstream of communication with said service line whereby an alternate flow through the service line or bypass line can be effected through a control of said valves.

3. The system of claim 2 including a back flow preventing check valve in said service line immediately upstream of the point of communication of the feed line therewith.

4. The system of claim 3 wherein said liquid separator includes selectively openable liquid draining means.

5. The method of blowing down a gas distribution system including a service line through which a gaseous flow is occurring comprising the steps of: terminating the flow through the service line at a predetermined point, venting the flow upstream of said point through a closed system including a liquid separator for separating the liquid component of a liquid-gas mixture, retaining the liquid component, passing the gaseous components through a compressor for a pressurization thereof, and returning the pressurized gaseous components through the service line downstream of the point at which the flow was stopped.

* * * * *